United States Patent
Karlicek, Jr. et al.

(10) Patent No.: US 9,363,859 B2
(45) Date of Patent: Jun. 7, 2016

(54) SENSORY LIGHTING SYSTEM AND METHOD FOR CHARACTERIZING AN ILLUMINATION SPACE

(71) Applicants: Rensselaer Polytechnic Institute, Troy, NY (US); Trustees of Boston University, Boston, MA (US)

(72) Inventors: Robert F. Karlicek, Jr., Mechanicville, NY (US); Richard J. Radke, Slingerlands, NY (US); Thomas D. C. Little, Newtown, MA (US); Pankil M. Butala, Brighton, MA (US); Li Jia, Troy, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 0 days.

(21) Appl. No.: 14/394,888

(22) PCT Filed: Apr. 19, 2013

(86) PCT No.: PCT/US2013/037300
§ 371 (c)(1),
(2) Date: Oct. 16, 2014

(87) PCT Pub. No.: WO2013/158955
PCT Pub. Date: Oct. 24, 2013

(65) Prior Publication Data
US 2015/0061509 A1 Mar. 5, 2015

Related U.S. Application Data (60) Provisional application No. 61/687,239, filed on Apr. 20, 2012.

(51) Int. Cl.
*H05B 33/08* (2006.01)
*H05B 37/02* (2006.01)
(Continued)

(52) U.S. Cl.
CPC .......... *H05B 33/0854* (2013.01); *G01S 17/026* (2013.01); *G06K 9/00369* (2013.01);
(Continued)

(58) Field of Classification Search
CPC ..................... H05B 33/0854; G01S 17/026
USPC ............... 250/206.1, 206.2, 221, 559.29; 315/312, 297, 294; 362/231
See application file for complete search history.

(56) References Cited

U.S. PATENT DOCUMENTS 7,855,376 B2* 12/2010 Cantin et al. ............. 250/559.29
8,723,689 B2* 5/2014 Mimeault ................. 340/932.2
(Continued)

FOREIGN PATENT DOCUMENTS

| CN | 101356450 A | 1/2009 |
|---|---|---|
| JP | 2011253716 | 12/2011 |

(Continued)

OTHER PUBLICATIONS

International Search Report for PCT/US2013/037300 mailed Jul. 29, 2013.
(Continued)

*Primary Examiner* — Douglas W Owens
*Assistant Examiner* — Pedro C Fernandez
(74) *Attorney, Agent, or Firm* — RatnerPrestia (57) ABSTRACT

Disclosed herein is an illumination system including an array of LED light sources for emitting light encoded with a modulation pattern, an array of sensors and a space characterization unit. The array of sensors receives emitted light scattered by an object. Each sensor determines a distance between the corresponding light source and the object using the modulation pattern. The space characterization unit uses the distance from each sensor to generate an elevation map indicating a presence of the object.

14 Claims, 8 Drawing Sheets

(51) Int. Cl.
*G06T 7/00* (2006.01)
*G06K 9/00* (2006.01)
*G06K 9/20* (2006.01)
*G01S 17/02* (2006.01)

(52) U.S. Cl.
CPC .......... *G06K9/00771* (2013.01); *G06K 9/2027* (2013.01); *G06T 7/0057* (2013.01); *H05B 33/0803* (2013.01); *H05B 37/0227* (2013.01); *G06T 2207/10016* (2013.01); *G06T 2207/10152* (2013.01)

(56) References Cited

U.S. PATENT DOCUMENTS

| | | | | |
|---|---|---|---|---|
| 2005/0012055 | A1* | 1/2005 | Chien | 250/559.01 |
| 2005/0243556 | A1* | 11/2005 | Lynch | 362/276 |
| 2006/0044800 | A1* | 3/2006 | Reime | 362/276 |
| 2010/0309024 | A1 | 12/2010 | Mimeault | |
| 2011/0031897 | A1 | 2/2011 | Henig | |
| 2012/0019168 | A1 | 1/2012 | Noda | |

FOREIGN PATENT DOCUMENTS

| | | |
|---|---|---|
| KR | 1020110070063 | 6/2011 |
| TW | 200913781 A | 3/2009 |
| WO | 2008135942 | 11/2008 |
| WO | WO 2008/135941 A1 | 11/2008 |
| WO | WO 2009/133505 A1 | 11/2009 |

OTHER PUBLICATIONS

Written Opinion of the International Searching Authority for International Application No. PCT/US2013/037300, mailed Jul. 29, 2013.
Chinese Search Report issued in Chinese Patent Application No. 201380032826.X dated Jan. 19, 2016.
Chinese First Office Action issued in Chinese Patent Application No. CN 201380032826.X dated Jan. 29, 2016.
Supplementary European Search Report issued in EP 13777655 dated Feb. 8, 2016.
Communication Pursuant to Article 94(3) EPC issued in EP 13777655.5 dated Mar. 1, 2016.

\* cited by examiner

SENSORY LIGHTING SYSTEM AND METHOD FOR CHARACTERIZING AN ILLUMINATION SPACE

CROSS REFERENCE TO RELATED APPLICATIONS

This application is the U.S. National Phase Application of PCT/US2013/037300, filed Apr. 19, 2013, and claims the benefit of U.S. Provisional Application No. 61/687,239 entitled SENSORY LIGHTING SYSTEM filed on Apr. 20, 2012, the contents of which are incorporated herein by reference.

STATEMENT REGARDING FEDERALLY SPONSORED RESEARCH

The present invention was supported in part by a grant from the National Science Foundation (Grant No. EEC-0812056) and in part by a grant from NYSTAR (Grant No. C090145). The United States Government may have certain rights to the invention.

FIELD OF THE INVENTION

The present invention relates to illumination systems and methods for characterizing a space for illumination.

BACKGROUND OF THE INVENTION

Illumination currently consumes approximately 19% of all electrical energy, and many commercial spaces, can consume up to 40% of a typical office building's electrical energy consumption. While the electrical energy consumed by lighting systems could be reduced by over 35% with the use of advanced lighting control systems, these systems are rarely used as they require frequent calibration to properly adapt to both short (personal lighting needs) and longer term (interior redesign) changes. Current lighting control based on infrared motion sensors and ultrasonic sensors may be of limited use in lighting control, and the lighting system itself may be blind, as lighting sources may not be able to see the space or objects illuminated by the generated light. Some current approaches may use camera systems to provide lighting systems with a sense of what needs to be illuminated and when. However, there may be privacy concerns associated with the camera systems. Current approaches for adaptive lighting control may also generate unnecessary complexity through processing large amounts of video information.

SUMMARY OF THE INVENTION

According to one aspect of the invention, an illumination system and a method of characterizing a space for illumination are provided. The illumination system includes an array of light emitting diode (LED) light sources disposed in a space for illumination, an array of sensors proximate to the array of LED light sources and a space characterization unit. Each light source is configured to emit light encoded with a predetermined modulation pattern in the space. The emitted light from among the plurality of LED light sources is scattered by at least one object in the space. The array of sensors is configured to receive the scattered light from the at least one object in the space. Each sensor is configured to determine a distance between the corresponding light source and the at least one object based on detection of the predetermined modulation pattern in the received scattered light. The space characterization unit is configured to receive the distance from each sensor and to generate an elevation map of the space. The elevation map indicates a presence of the at least one object in the space.

DETAILED DESCRIPTION OF THE INVENTION

Methods for characterizing an illumination space and an illumination system including an array of LED light sources are described.

Aspects of the invention include exemplary methods for characterizing a space for illumination and an exemplary illumination system. The illumination system may include an array of light sources that, in addition to illuminating a given volume of space, encodes the illumination with a time modulated data signal (i.e., a predetermined modulation pattern), and incorporates a network of widely-separated, low pixel-count light sensors distributed throughout the illumination system. The illumination system may be used for indoor lighting or outdoor lighting. The sensors may measure a time between emission from a given light source (including the time modulated data signal) and the return of some portion of the light containing the data signal. The returned portion of the light may be scattered from one or more surface of objects in the space illuminated by the array of light sources. This measurement process, typically called time-of-flight (ToF), may be used by the illumination system to create an elevation map of animate and inanimate objects within the illuminated space. The illumination system may determine characteristics of the illuminated space based on the elevation map. The characteristics may be used, for example, to monitor and detect changes in a profile of the illuminated space. The characteristics may be used, for example, for lighting control (such as for energy conservation), occupant monitoring, safety functions and security functions.

Figure 1:
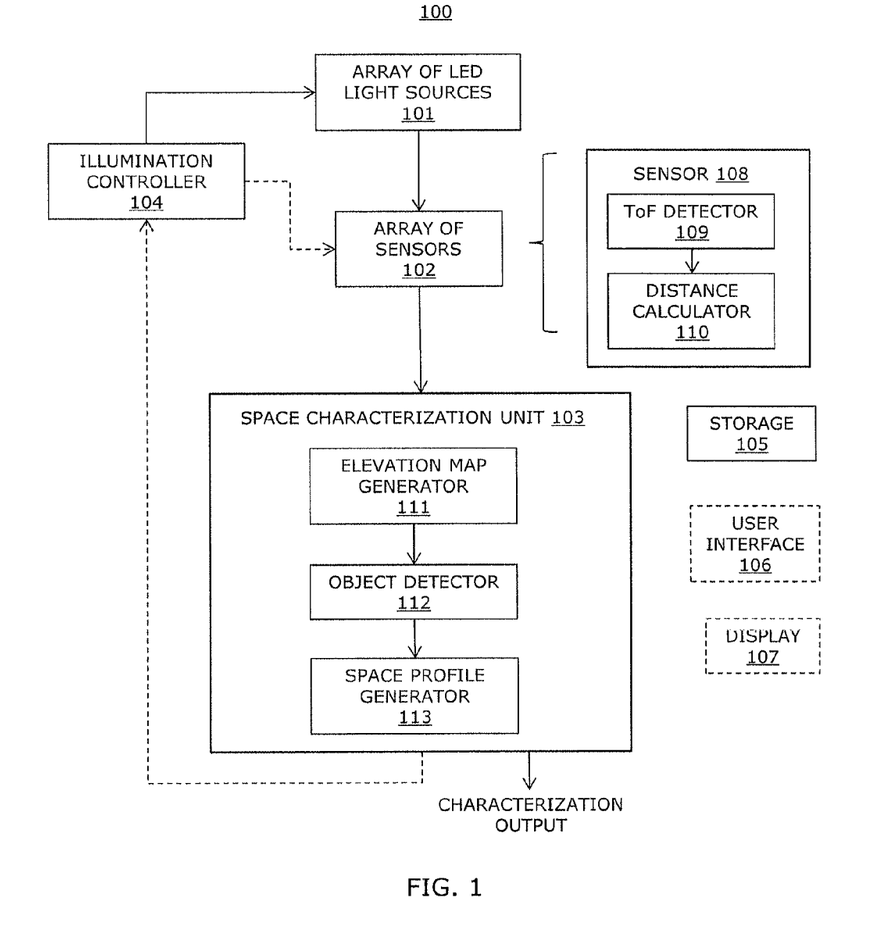
FIG. 1 depicts a functional block diagram of an exemplary illumination system for characterizing an illumination space.

Referring to FIG. 1, a functional block diagram of exemplary illumination system 100 is shown. Illumination system 100 may include array of LED light sources 101 (referred to herein as array 101), array of sensors 102 (referred to herein as sensor array 102), space characterization unit 103, illumination controller 104 and storage 105. Illumination system 100 may include one or more of optional user interface 106 and optional display 107. Array 101, sensor array 102, space characterization unit 103, illumination controller 104, storage 105, optional user interface 106 and/or optional display 107 may be coupled via a data and control bus (not shown).

Figure 2:
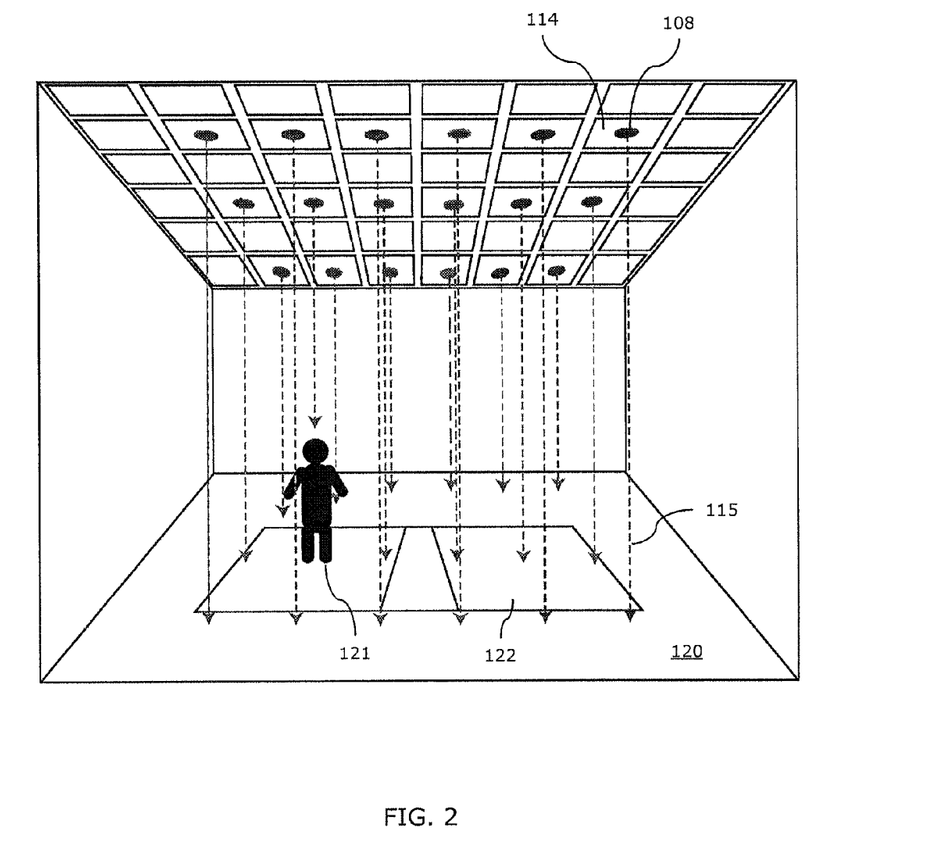
FIG. 2 depicts a perspective view diagram of an exemplary illumination system in an illumination space illustrating determination of distance to objects in the space.

Array 101 may include a plurality of LED light sources 114 (FIG. 2) arranged in a space to illuminate the space (also referred to herein as an illumination space). For example, FIG. 2 illustrates light sources 114 uniformly disposed as a two-dimensional array proximate a ceiling of illumination space 120, to uniformly illuminate space 120. Although light sources 114 are illustrated in FIG. 2 as arranged in a uniform two-dimensional array, it is understood that light sources 114 may be arranged in a non-uniform array, and that the array may be a one-dimensional array or a three-dimensional array. It may be appreciated that the arrangement of light sources 114 may depend on physical characteristics of the illumination space and the desired illumination characteristics. In general, light sources 114 may be separated by any suitable spacing, to illuminate the illumination space. Light sources 114 may be spaced, for example, without being limited to, between about 60 cm and about 2 m.

Light source 114 may include any suitable diode, capable of emitting light in at least one desired wavelength. Although light source 114 is described herein with respect to a light emitting diode, light source 114 may also include a semiconductor laser diode. According to one embodiment, a wavelength of the emitted light from light source 114 may be used directly by corresponding sensor 108 to characterize the illumination space. According to another embodiment, at least one of light sources 114 may have part of its wavelength converted to at least one other wavelength, for example, using phosphor conversion. One or more wavelengths emitted by the phosphors may be used by corresponding sensor 108.

Light sources 114 may include spot light sources or flood light sources designed to nominally uniformly illuminate a space. In an exemplary embodiment, each light source 114 may be paired with a single downward-looking color or distance sensor 108 with a relatively narrow field of view (i.e., solid angle over which light is integrated), collecting scattered light from objects (such as from person 121 and an inanimate object 122 in FIG. 2) illuminated by light source 114.

According to another exemplary embodiment, light sources 114 may include LED based panel lights. As used herein, a panel light is any LED fixture design that mimics an optical performance of a fluorescent fixture. Similarly to an array of spot light or flood light sources, the panel lights may contain or be proximate to downward-looking high speed sensors 108.

Light sources 114 in array 101 may be configured to be modulated by a predetermined modulation pattern, via illumination controller 104. Operation of individual light sources 114 in array 101 (such as on/off operation, light intensity operation, etc.) may also be controlled by illumination controller 104. Array 101 may, thus, emit light to illuminate the illumination space and also modulate the emitted light. For example, predetermined modulation patterns may include time sequences of on and off patterns generated using orthogonal Gray codes (or any other suitable orthogonal pattern). As another example, the output luminous flux (intensity of light) may be switched between two levels at a desired frequency. As an additional example, the output luminous flux may be modulated with a scaled cosine signal of a predetermined frequency to generate a sinusoidal pattern. In general, the average luminous flux over time may provide illumination. A frequency of modulation may determine the range of distances that can be unambiguously measured. The phase shift caused by the round trip between the emitted pattern and the scattered (reflected) pattern gathered by sensor 108 may provide the distance metric.

According to an example embodiment, each light source 114 may be modulated by different predetermined modulation patterns (so that sensor 108 associated with an individual light source 114 detects the corresponding predetermined modulation pattern). According to another example embodiment, more than one light source 114 may be modulated by a same predetermined modulation pattern. For example, light sources 114 that are sufficiently distant from each other (such as across the room) may be modulated by a same pattern.

According to an exemplary embodiment, light source 114 may include a monochromatic LED light source for emitting a wavelength in the visible spectrum, where the wavelength is between, without being limited to, about 400 nm to about 800 nm. According to another embodiment, light source 114 may include at least one of ultraviolet (UV) LED light sources or infrared (IR) light sources. Accordingly, light source 114 may have a wavelength between, without being limited to, about 220 nm to about 1,600 nm.

According to another exemplary embodiment, light source 114 may include a polychromatic light source (i.e., a multicolored light source). For example, typically three wavelengths are used to generate white light. The wavelengths may include about 470 nm (i.e., blue), about 525 nm (i.e., green) and about 620 nm (i.e., red), with variations of up to about ±20 nm. For fuller spectrum lighting, additional wavelengths may be added, including, without being limited to, about 585 nm (i.e., yellow), about 420 nm (i.e., deep blue), about 650 nm (i.e., deep red), about 500 nm (i.e., cyan) and/or about 550 nm (i.e., deep green).

For example, a multicolored light source may include a plurality of monochromatic LEDs having different wavelengths. The individual colors in the light source may be modulated independently via illumination controller 104. In this embodiment, one or more sensors 108 (each capable of tracking the modulated signal of one or more of the monochromatic sources), may be used to create a coarse 3D topographic color map of the illuminated space. The additional information provided by color mapping may improve a resolution of a ToF distance mapping function (by sensor array 102), by compensating for differences in the spectral reflectivity of the object scatting light back to sensor 108. Thus, by modulating individual wavelengths for sensing (by sensor array 102), illumination system 100 may provide improved spatial resolution by color.

Sensor array 102 may include a plurality of sensors 108 which correspond to light sources 114 (FIG. 2) of array 101. Sensors 108 may be formed as part of light sources 114, or may be arranged proximate to light sources 114.

According to an exemplary embodiment, each light source 114 in array 101 may be paired with a corresponding sensor 108. According to another embodiment, some of light sources 114 may be paired with a corresponding sensor 108 (such as shown in FIG. 2), while other light sources 114 in array 101 may not be modulated. According to yet another embodiment, more than one light source 114 may be paired with a corresponding sensor 108. For example, as described further below, two light sources 114 having a same predetermined modulation pattern may be paired with sensor 108.

It may be understood that a spacing of sensors 108 in sensor array 102 may be selected depending upon a desired resolution of the elevation map (described further below). For example, the sensor spacing may be selected to provide a reduced resolution map that may indicate the presence of objects in the space, but may not include details regarding the objects (such as an identity of a person) in the space. The reduced resolution may be desirable to preserve the privacy of individuals captured by the elevation map. In an exemplary embodiment, the sensor spacing includes, without being limited to, between about 10 cm to about 60 cm. According to an example embodiment, an optimal range for the sensor spacing may be determined based on study of privacy versus minimum resolution (i.e., capable of indicating the presence of objects in the space) for performance.

Detector 108 may include ToF detector 109 and distance calculator 110. ToF detector 109 may measure the time the emitted light takes to travel from corresponding light source 114 to an object (such as person 121 in FIG. 2) and back to sensor 108. For example, FIG. 2 illustrates ToF rays 115 between sensors 108 and objects (such as person 121 and inanimate object 122) in space 120. The duration of ToF rays is related to the distance between light source 114 and objects in space 120. In FIG. 2, it is assumed that sensor 108 is at substantially a same location as light source 114. It is understood that the ToF may be adjusted for any difference between the locations of light source 114 and sensor 108.

According to an exemplary embodiment, ToF detector 109 may include a low-pixel-count image sensor (e.g., from about 3×3 pixels to about 200×200 pixels) to measure the ToF. ToF detector 109, for example may resolve angular and/or temporal signatures of the predetermined modulation pattern (such as a phase shift of the pattern) to determine the ToF.

Distance calculator 110 may receive the ToF measurement from ToF detector 109 and may determine a distance from light source 114 to the object (such as person 121). The distance may be determined, for example, by the round trip of the emitted light.

The predetermined modulation pattern may be emitted by array 101 periodically, continuously or during any time period for characterizing the illumination space. Sensor array 102 may, optionally, be controlled by illumination controller 104, to synchronize the ToF measurement with emission of the predetermined modulation pattern. According to another embodiment, sensor array 102 and array 101 (via illumination controller 104) may be synchronized by a clock signal from a clock generator (not shown).

Space characterization unit 103 may receive distance information from each sensor 108 of sensor array 102 and may produce a characterization output representing the illumination space. The characterization output may be used to control illumination by array 101 via illumination controller 104. The characterization output may also be indicated on optional display 107, or may be transmitted to a remote location, for example via a global network (i.e., the Internet). It is also understood that space characterization unit may be remotely coupled to sensor array 102, so that the characterization may be determined at a location remote from sensor array 102.

Space characterization unit 103 may include elevation map generator 111, object detector 112 and space profile generator 113. Elevation map generator 111 may receive the distance information from sensor array 102 and may generate an elevation map of the illumination space. The elevation map may indicate a presence of one or more objects in the illumination space. Elevation map generator 111 is described further below with respect to FIGS. 3 and 4.

Object detector 112 may receive the elevation map from elevation map generator 111 and determine whether the elevation map includes one or more objects. Object detector 112 may also determine at least one of locations of the objects, whether the objects are animate or inanimate, movement of the objects or a pose of the objects (such as standing or seated). Object detector 112 is described further below with respect to FIG. 4.

Space profile generator 113 may receive object information from object detector 112 and may update a profile of the illumination space. For example, detection of a new person in the illumination space or no detection of animate objects in the room may cause the profile to be updated. In addition, changes in the profile may trigger a characterization output, such as to optional display 107. For example, if a person is detected in an illumination space that was previously unoccupied, an alert may be provided to optional display 107 (such as for security purposes).

Space characterization unit 103 may be configured to control operation of one or more of array 101, sensor array 102, illumination controller 104, optional user interface 106 and optional display 107. Alternatively, a separate controller (not shown) may be used to control operation of components of illumination system 100. Space characterization unit 103 may include, for example, a logic circuit, a digital signal processor, a microcontroller or a microprocessor.

Illumination system 100 may include storage 105. Storage 105 may store one or more values for array 101, sensor array 102, space characterization unit 103, illumination controller 104, optional user interface 106 and/or optional display 107. For example, storage 105 may store predetermined modulation patterns for illumination controller 104, distances determined by sensor array 102, elevation maps, detected objects and/or profile information. Storage 105 may include, for example, a random access memory (RAM), a magnetic disk, an optical disk, flash memory or a hard drive.

Illumination system 100 may include optional user interface 106, such as a pointing device, a keyboard and/or a display device for operating illumination system 100. Optional display 107 may include any suitable display device capable of presenting at least one of the elevation map, detected objects, profile information or characterization information. Although optional user interface 106 and optional display 107 are illustrated as separate devices, it is understood that the functions of optional user interface 106 and optional display 107 may be combined into one device.

It is understood that components of one or more of array 101, sensor array 102, space characterization unit 103, illumination controller 104, storage 105, optional user interface 106 and optional display 107 may be implemented in hardware, software or a combination of hardware and software.

Referring to FIG. 1 and FIG. 2 in operation, light source 114 may modulate the emitted light with a predetermined modulation pattern, and the paired sensor 108 may measure the time (represented by ToF ray 115) for the transmitted light from light source 114 to return to sensor 108. Distance calculator 110 of sensor 108 may calculate the distance traversed by the photons emitted by the source based on the ToF measurement. This distance information may be transmitted from all of the light sources 114 and sensor 108 combinations to space characterization unit 103, where a low resolution elevation map of the illuminated space may be generated (such as by elevation map generator 111).

Illumination system 100 may discern the location of furniture, architectural and animate objects, via the elevation map. The elevation map may also be used to appropriately illuminate the space while minimizing energy consumption. Illumination system 100 may detect rapid changes in the position of moving objects, including actions related to possible security issues (running) or safety issues (falling). Illumination system 100 may also be used to track the routine motion(s) of moving objects in the illuminated space.

In an exemplary embodiment, illumination controller 104 may coordinate the modulation of array 101 such that sensor array 102 measurements may depend on the delay of the light scattered back to the respective sensor 108 nominally directly under the associated light source 114. In this example, the distance measurement may be performed without regard to the specific structure (i.e., pattern) used to modulate the illumination, except that the selected data structure may be used to reduce measurement errors due to light scattered to the sensor 108 from other light sources 114 in the illuminated space.

According to an exemplary embodiment, each light source 114 may be modulated independently. Each light source 114 may be combined with a specific paired sensor 108 to measure the distance between the light source 114 and the surface of the object reflecting light directly back to the paired sensor 108. The information from each sensor 108 in the illuminated space may be combined by space characterization unit 103 to create the elevation map of the illuminated space.

According to another embodiment, a coordinated modulation may be used between sources (similar to phased array technology in ultrasonic or radar imaging). For example, sensor array 102 may measure the distance between any light source 114 illuminating the space and a scattering surface reflecting light to a given sensor 108. In this example, a phased-array time-of-flight detection could be used to improve the spatial resolution of the topographic map of the illuminated space. The increased spatial resolution may result in an improvement in occupancy measurement and resolution of illuminated structures that can be localized (relative to the position of the lighting sources in a given space). The improved occupancy measurement may allow for optimal illumination of the space and, if desired, data communication using the visible light itself.

In the above example, array 101 may be operated in a coordinated manner and at sufficiently high switching frequency so as to appear at the correct intensity and color for illumination purposes, but enable corresponding sensor array 102 to detect returned light from discrete light sources 114. By phasing the intensity and/or color signal from each arrayed light source 114, arrayed sensors 108 may uniquely estimate which signal came from which source, and may more accurately estimate distance and location of animate and inanimate objects in the illuminated space. If discrete phasing of colors is included, a local color distribution may also be estimated. This may improve the signal-to-noise ratio (SNR) of illumination system 100. For inanimate objects with a nominally static color, the sensing may discriminate the background from mobile objects and may also sense when changes (like illuminated space design changes) have occurred.

In an exemplary embodiment, the distance resolution for illumination system 100 may be between about 50 cm to about 3 m. Because of the distance resolution, it is desirable to produce accurate time measurements (of the returned light scattered by one or more objects). In general, the time resolution depends on the volume of the space to be illuminated, but is generally less than about $10^{-8}$ s, with most indoor spaces having a time resolution on the order of $10^{-10}$ s or less.

Figure 3:
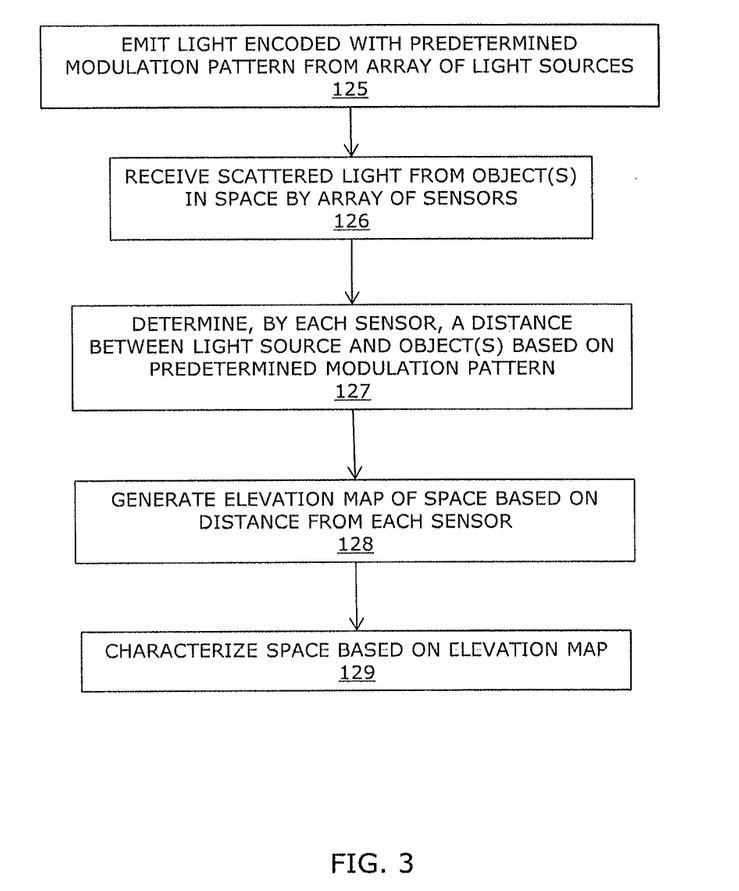
FIG. 3 is a flow chart that depicts an exemplary method for characterizing an illumination space.

Referring next to FIG. 3, a flow chart of an exemplary method for characterizing a space for illumination is shown. At step 125, light encoded with a predetermined modulation pattern is emitted from an array of light sources. For example, illumination controller 104 (FIG. 1) may be used to modulate the emitted light from array 101.

At step 126, the emitted light which is scattered from object(s) in the illumination space are received by sensor array 102 (FIG. 1). At step 127, each sensor 108 (FIG. 1) may determine a distance between an associated light source 114 (FIG. 2) and an object (such as person 121) based on the predetermined modulation pattern. For example, ToF detector 109 (FIG. 1) may determine a time-of-flight based on the pattern, and distance calculator 110 may determine the distance from the time-of-flight.

At step 128, an elevation map of the illumination space is generated based on the distance determined by each sensor 108 (FIG. 1), for example, by elevation map generator 111 of space characterization unit 103. At step 129, the illumination space is characterized based on the elevation map, for example, by object detector 112 (FIG. 1) and space profile generator 113 of space characterization unit 103.

Figure 4:
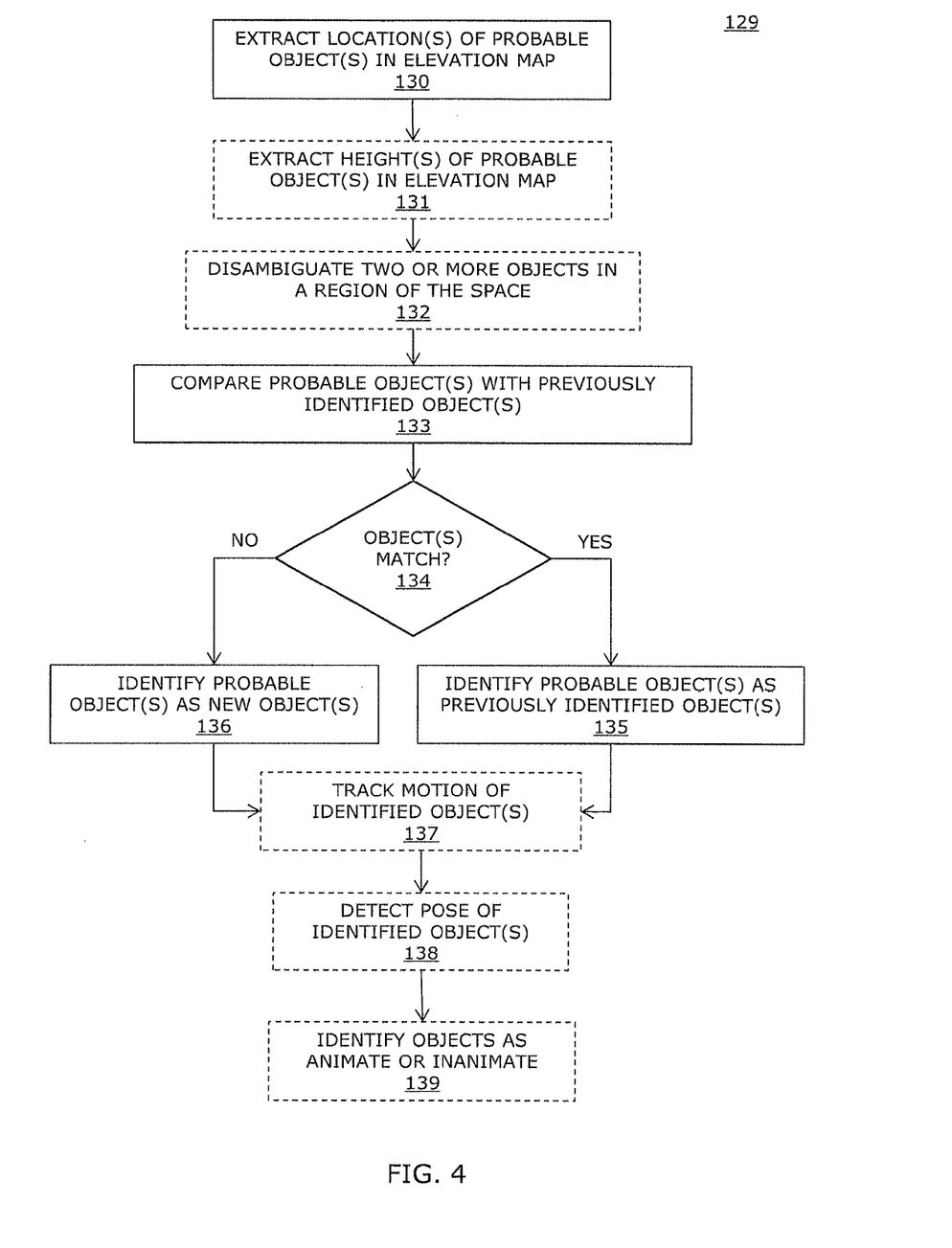
FIG. 4 is a flow chart that depicts an exemplary method for characterizing an illumination space based on an elevation map.

Referring next to FIG. 4 a flow chart of an exemplary method for characterizing a space for illumination based on an elevation map (step 129 of FIG. 3) is shown. The steps shown in FIG. 4 may be performed by object detector 112 shown in FIG. 1.

At step 130, location(s) of probable object(s) are extracted in the elevation map. At optional step 131, height(s) of the probable object(s) are extracted in the elevation map. For example, the extracted height(s) may be used to determine a pose (e.g., sitting or standing) of people in the illuminated space.

At optional step 132, two or more objects in a region of the space may be disambiguated. For example, if the resolution of the elevation map is too coarse to distinguish individual objects (such as a person and a desk), it may be desirable to further process the elevation map to separate the two objects. An example of disambiguation processing is described further below.

At step 133, the probable object(s) are compared with previously identified object(s), to determine whether the probable object(s) are new objects or previously identified objects(s) (which may be stationary or moving). At step 134, it is determined whether the probable object(s) and previously identified object(s) match.

If, at step 134, the probable object(s) and previously identified object(s) match, step 134 proceeds to step 135, and the probable object(s) are identified as the previously identified object(s). Step 135 proceeds to optional step 137.

If, at step 134, the probable object(s) and previously identified object(s) do not match, step 134 proceeds to step 136, and the probable object(s) are identified as new object(s). Step 136 proceeds to optional step 137.

At optional step 137, any motion of the identified object(s) is tracked. For example, a previous position(s) of the identified object(s) in a previously generated evaluation map may be compared with the current position(s). At optional step 138, a pose of identified object(s) may be identified, for example, based on the extracted height(s). An example of pose detection is described further below. At optional step 139, the identified object(s) may be further identified as animate (such as people) or inanimate (such as furniture). It is understood that optional steps 137-139 may be performed in an order different from what is shown.

Examples of Real-Time Person Tracking and Pose Recognition

Experiments were conducted to investigate real-time person tracking and pose recognition using an illumination system similar to exemplary illumination system 100 shown in FIG. 1. In the experiments, a ceiling-mounted, downward-pointed SwissRanger SR4000 ToF camera distributed commercially by Mesa Imaging of Zürich, Switzerland was used as a proxy for illumination system 100 shown in FIG. 1. The camera emits radio frequency (RF)-modulated (30 MHz) near-infrared light (850 nm), which is back-scattered by the scene and received by a complementary metal-oxide-semiconductor (CMOS) charge-coupled device (CCD).

The sensor continuously collects range and intensity measurements at a resolution of 176144 pixels. The angular resolution for each pixel is 0.39 at the center of the image, which corresponds to a 1.7 cm square on the ground, a 9 mm square on the head of a sitting person, and a 4.5 mm square on the head of a standing person (assuming a 2.5 m ceiling). Because the ToF sensor emits divergent rays from a single center of projection, each distance measurement is modified by multiplying the raw sensor value by the cosine of the viewing angle to mimic orthographic projection. Distance measurements described below refer to this orthographic projection. The absolute accuracy in the distance measurements is approximately 10 mm within a range of 0.8 m-5.0 m. In the experiments, integration times of 6.3 ms-8.3 ms were used leading to frame rates of 23.4 fps-19.4 fps, respectively. The amplitude threshold is set in the range of 70-100 (on a scale of 0 to 16382).

Figure 5A:
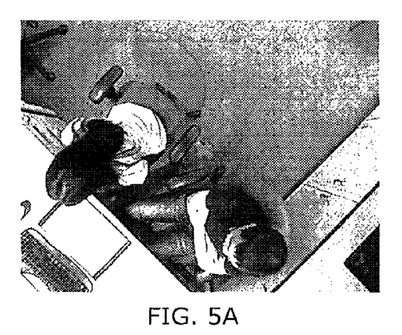
FIG. 5A is an example image of an office environment.
Figure 5B:
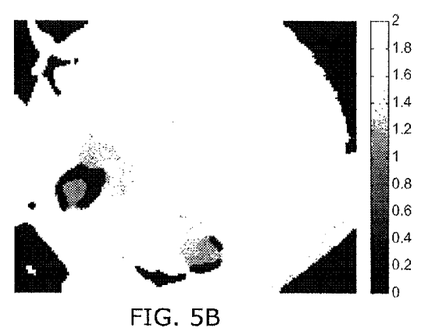
FIG. 5B is an example time-of-flight (ToF) image of the office environment shown in FIG. 5A, according to an embodiment of the invention.

The system was mounted in an office setting in which the height of the ceiling is 2.5 m. The sensor's field of view is about 2.0 m×1.6 m on the ground. FIG. 5A is an example image of the office environment and FIG. 5B is a corresponding time-of-flight image, which shows the measured distance from the sensor to each point in the scene.

To investigate time-of-flight imaging in larger environments, a three-dimensional (3D) 18×14 m$^2$ simulated lab space was created using the Unity game engine developed by Unity Technologies of Copenhagen, Denmark. Distance images are created by casting rays downwards from simulated sensors that are spaced regularly on the ceiling and return the range to hit points. These images are processed by the algorithms described herein in the same way as the images output from the real ToF sensor.

Several videos were also recorded, both in the real and simulated environments, containing multiple people and pieces of furniture to design and test the algorithms. The most complicated real video contains four people entering the scene at different times, introducing and moving office chairs, sitting down close together, and leaving at different times. The simulated environment includes up to 30 people entering the lab, walking around, sitting down, standing up, standing close to each other, gathering around the conference table and in front of the experimental bench, and leaving the room.

The experiments examine real-time detection of humans, tracking of their positions, and estimation of their pose (i.e., either standing or sitting) from the distance measurements. Morphological image processing algorithms are combined with higher-level logic about how objects can move and interact. Each person entering the scene is detected at the image boundary and given a unique label. Each person blob is then tracked throughout the following images until it leaves the fame. Each person blob's location and height is measured in each frame, and its coarse pose is estimated from the height information.

Figure 6:
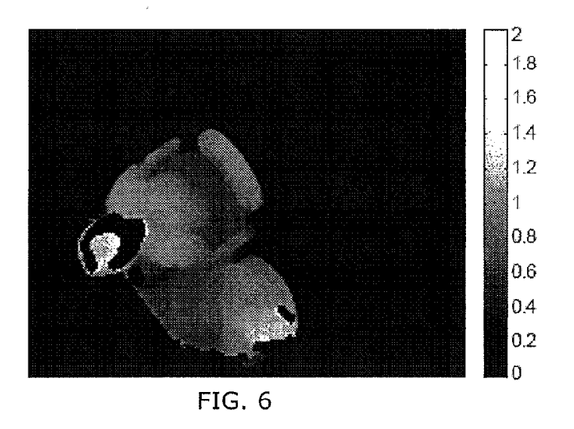
FIG. 6 is an example elevation map determined from the ToF image shown in FIG. 5B, according to an embodiment of the invention.
Figure 7A:
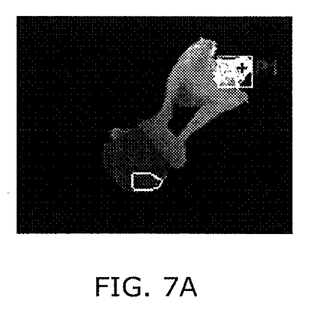
FIGS. 7A, 7B, 7C, 7D and 7E are example elevation maps including detected objects, for various multiple person environments, according to an embodiment of the invention.
Figure 7B:
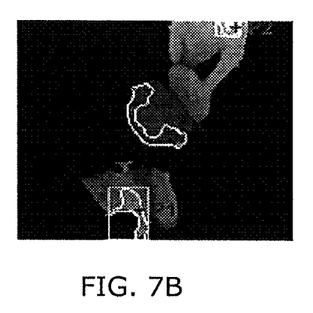
Figure 7C:
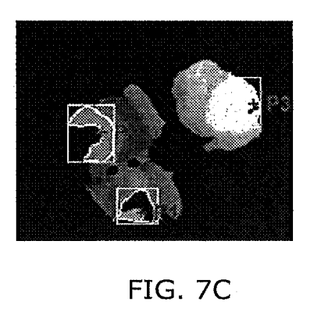
Figure 7D:
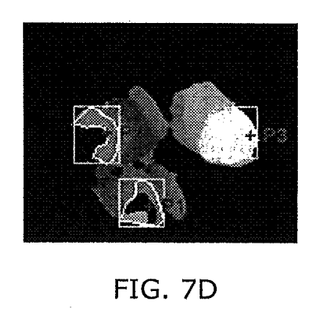
Figure 7E:
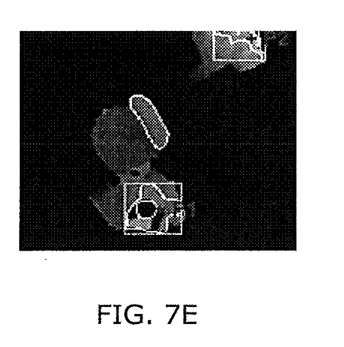

A real-time elevation map is obtained by subtracting the real-time distance images from the known height of the ceiling. It is also assumed that a background elevation map exists that contains no people or movable furniture, denoted as B(x, y), which can be acquired during system calibration. From the current elevation map $E_t(x, y)$, an elevation map of the foreground objects in the scene $F_t(x; y)$ is obtained using background subtraction and thresholding as:

$$F_t(x, y) = \begin{cases} 0 & \text{if } |Et(x, y) - B(x, y)| < \tau \\ E_t(x, y) & \text{otherwise} \end{cases} \quad (1)$$

where $\tau$ represents the threshold. The threshold $\tau$ is set to 10 cm, which is lower than the height of a human (even while lying on the ground). FIG. 6 illustrates an example elevation maps of the foreground objects in the real environment shown in FIG. 5A.

After background subtraction, humans may be detected in the scene by thresholding the foreground map. With the assumption that every person walks into the scene, a threshold is applied to the foreground image with a height of 0.9 m, classifying every connected region (or "blob") above this height as a person. Every person blob in the current frame is compared against the person blobs in the previous frame to find the closest spatial match. The height of the blob is assigned to be the elevation value at the weighted centroid of the blob. This height observation in frame t is denoted as $y_t$. A median filter is applied to $y_t$ to mitigate impulsive sensor noise prior to subsequent processing.

Probabilistic models are widely used for activity recognition, because they are suited to dealing with noise and uncertainty. A label of "standing" or "sitting" is assigned to each person blob using a maximum likelihood estimator that takes into account both the current height observation and a simple Markov model for the probabilities of transitions between states. That is, the label is computed as $$l_t = \underset{l}{\operatorname{argmax}} \ \{p(y_t \mid l) + \lambda \cdot p(l \mid l_{t-1})\} \quad (2)$$

where $l_t \in \{\text{"stand"}, \text{"sit"}\}$. The first term reflects the likelihood of the observed height given a proposed label. For "stand" this is modeled as a Gaussian distribution with mean equal to the observed height of the person on their first appearance. The "sit" distribution is similar, but the mean of the Gaussian is half the entrance height, based on measured data of humans' sitting height ratio. The standard deviations for "sit" and "stand" are 0.1 and 0.2, which were learned from training datasets. The second term denotes the transition probability, which encourages the label to stay the same so that compelling evidence is required in the height observation to change the label. The transition probability matrix is:

$$\begin{bmatrix} p(\text{"sit"} \mid \text{"sit"}) & p(\text{"sit"} \mid \text{"stand"}) \\ p(\text{"stand"} \mid \text{"sit"}) & p(\text{"stand"} \mid \text{"stand"}) \end{bmatrix} = \begin{bmatrix} 0.8 & 0.2 \\ 0.2 & 0.8 \end{bmatrix}$$

which was learned from the training datasets. This makes the pose estimation more robust to noise in the measurement. The parameter $\lambda$ may be tuned to trade off the prior and measured information. In practice, $\lambda$ is set to 1. FIG. 4, described above, illustrates a method for tracking objects and estimating their pose.

Due to the low resolution and limited features that may be extracted from the elevation map, people and pieces of furniture (e.g., moving office chairs) may be difficult to robustly segment and distinguish, and may merge into one blob in the elevation map. Thus, a challenge to this approach may be splitting blobs that arise when multiple people are close together, and designing a sensor that responds to humans but not to moving furniture (e.g., the back of a chair is often at a comparable height to a seated person's head).

An exemplary approach to split touching objects is to process the elevation map to create plateaus with constant intensity around the main peaks. This is referred to as morphological reconstruction. The procedure: 1) uses the original image as a mask image, 2) erodes the original image to produce a marker image and 3) repeatedly dilates the marker image until it fits under the mask image.

FIGS. 7A-7E are example elevation maps including detected objects, for several full scale frames. Despite the presence of multiple moving office chairs, the correct number of people is maintained.

Figure 8A:
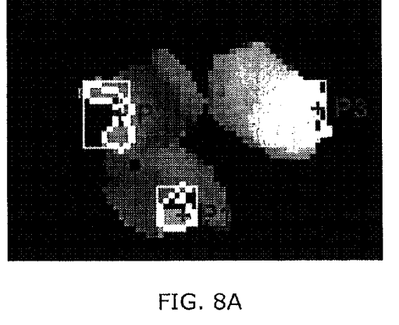
FIGS. 8A, 8B, 8C and 8D are example elevation maps including detected objects, for the elevation map shown in FIG. 7C with various sensor spacings, according to an embodiment of the invention.
Figure 8B:
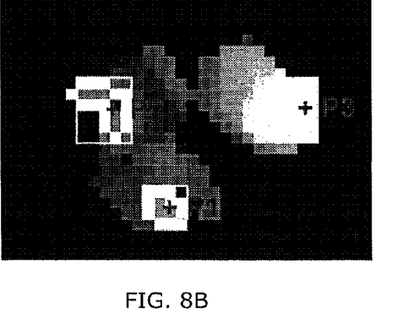
Figure 8C:
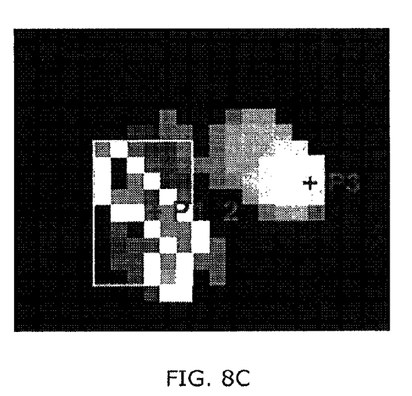
Figure 8D:
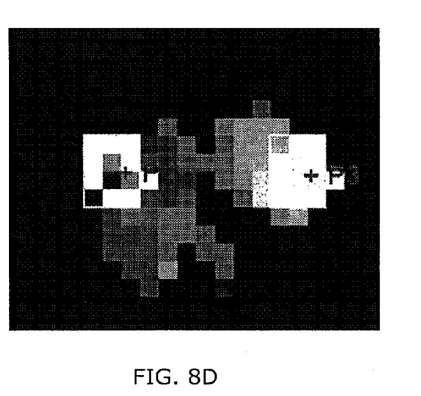

Next, the full resolution video is downsampled (using nearest-neighbor sampling) at different spacings to create lower-density video streams, to simulate widely-spaced single-pixel ToF elements. The exemplary algorithm described herein (and shown in FIG. 4) is applied to each downsampled stream. FIGS. 8A-8D show the tracking results in the same frame as FIG. 7C for several sensor spacings. In particular, FIG. 8A relates to a 0.03 m sensor spacing; FIG. 8B relates to a 0.06 m sensor spacing; FIG. 8C relates to a 0.09 m sensor spacing; and FIG. 8D relates to a 0.1 m sensor spacing. Because the downsampled frames are much smaller, the algorithm is much faster and can run at roughly the same rate as the input video.

However, as the simulated sparsity is increased to wider sensor spacings, the local maxima extraction algorithm begins to fail due to the limited number of pixels and lack of smoothness in the measurements. In such situations (e.g., a sensor spacing of 25 cm), rather than separating multiple people within a blob, and the algorithm keeps track of which people are combined in a multi-person blob until they separate. This may be suitable for a lighting control application, because maintaining the identity of each person blob may not be important.

Six datasets were collected for the experiments:
1) real video, 3790 frames, 1-2 people (only used for training);
2) real video, 1050 frames, 1-3 people (only used for testing);
3) real video, 15000 frames, 1-4 people (testing);
4) simulated video, 3000 frames, 6 people (training);
5) simulated video, 2700 frames, 6 people (testing); and
6) six simulated videos, 6000 frames each, 5, 10, 15, 20, 25 and 30 people (testing).

Experiments on Real Video

The local maxima extraction and tracking algorithm was tested on Datasets 2 and 3. The first video recorded 3 people entering the scene at different times, walking around, sitting on chairs close together, standing up, and leaving. FIGS. 7A-7E show an example of tracking on this video.

Figure 9A:
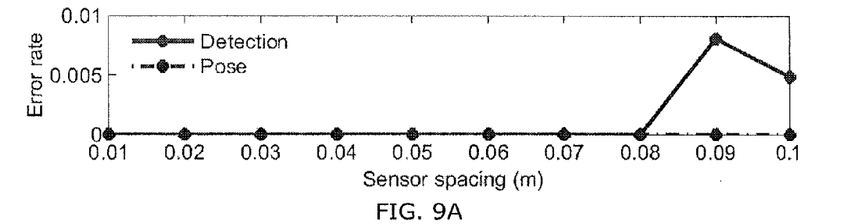
FIGS. 9A and 9B are example graphs of error rate and mean error as a function of sensor spacing for elevation maps of a real office environment, according to an embodiment of the invention.
Figure 9B:
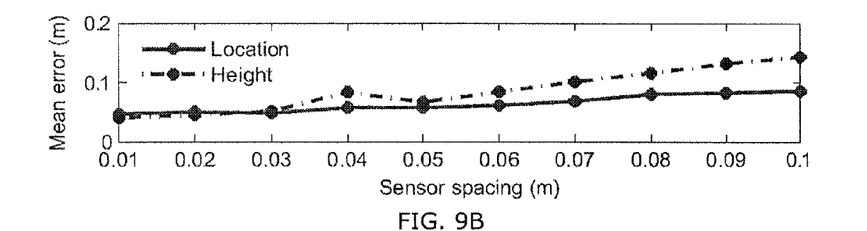

To analyze the performance at different sensor densities, the input video was spatially downsampled to simulate sensor spacings from 1 cm to 10 cm in steps of 1 cm, as illustrated in FIGS. 8A-8D. At each spacing level, the detections and estimated poses are recorded. FIG. 9A is a graph of the error rate of detection and pose estimation as a function of sensor spacing. The error rate is computed as the number of incorrectly detected/missed people (or the number of misclassified poses) divided by the total number of person appearances in all frames. FIG. 9B is a graph of the mean error in location and height measurements as a function of sensor spacing.

From FIGS. 9A and 9B, it can be seen that all three people are detected and tracked at all spacing levels up to 8 cm. When the frames are downsampled to 8 cm spacing, the local maxima extraction becomes unstable. The objects are easily missed or merged with each other.

A longer term experiment (Dataset 3) was conducted in which the same office environment was continuously monitored for 15000 frames. During this time, each person entrance/exit and pose change was manually recorded, using the full-frame video for ground truth. The results are summarized in Table 1.

TABLE 1

Performance compared with ground truth for experiments on real video

|  | Ground Truth | Detected | False Alarm |
| --- | --- | --- | --- |
| Entrance | 31 | 31 | 2 |
| Exit | 31 | 31 | 2 |
| Stand up | 54 | 53 | 2 |
| Sit down | 53 | 50 | 3 |

The performance was also analyzed with respect to the number of people in the frame, using the long video in Dataset 3, with a large sensor spacing of 8 cm. The results are shown in Table 2.

TABLE 2

Performance compared with ground truth for experiments on different numbers of people in real data

| Number of people | 1 | 2 | 3 | 4 |
| --- | --- | --- | --- | --- |
| Detection error rate (%) | 0 | 0 | 0.16 | 0.82 |
| Location mean error (m) | 0.10 | 0.11 | 0.12 | 0.12 |

Experiments on Environmental Simulation

To test the privacy-preserving features of the tracking algorithm, a video containing 2700 frames (Dataset 5) was recorded, involving six people entering the lab, walking around, sitting down, standing up, standing close to each other, grouped together around the conference table and in front of the experimental bench, and leaving the room.

Figure 10A:
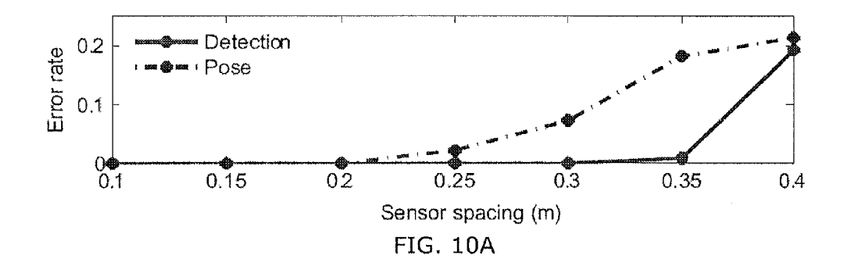
FIGS. 10A and 10B are example graphs of error rate and mean error as a function of sensor spacing for elevation maps of a simulated office environment, according to an embodiment of the invention.
Figure 10B:
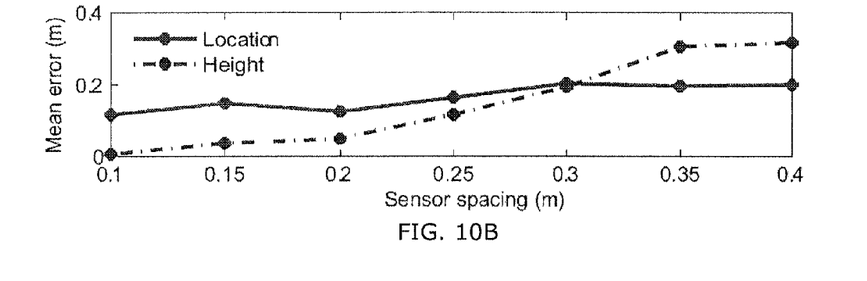

As with the real video experiments, the sample spacing was gradually increased, from 10 cm to 40 cm in increments of 5 cm. FIG. 10A is a graph of the error rate in person detection and pose classification as a function of sensor spacing. FIG. 10B is a graph of mean error in location and height estimation as a function of sensor spacing. Table 3 reports the detection and false alarm rates for exit, sit down and stand up events at the 30 cm spacing level.

TABLE 3

Performance compared with ground truth for experiments on experimental simulation

|  | Ground Truth | Detected | False Alarm |
| --- | --- | --- | --- |
| Entrance | 10 | 10 | 0 |
| Exit | 10 | 10 | 0 |
| Stand up | 10 | 10 | 1 |
| Sit down | 10 | 10 | 1 |

As in Table 2, the performance on the simulated video was measured as a function of the number of people. In this case, the environment can be populated with many more people, from 5 to 30 (Dataset 6). The results with a wide sensor spacing of 20 cm are summarized in Table 4.

TABLE 4

Performance compared with ground truth for experiments on different numbers of people in simulation

| Number of people | 5 | 10 | 15 | 20 | 25 | 30 |
|---|---|---|---|---|---|---|
| Detection error rate (%) | 0 | 0 | 0 | 0.02 | 0.53 | 0.72 |
| Location mean error (m) | 0.11 | 0.10 | 0.11 | 0.11 | 0.11 | 0.12 |

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An illumination system comprising:
an array of light emitting diode (LED) light sources disposed in a space for illumination, each light source configured to emit light encoded with a predetermined modulation pattern in the space, the emitted light from among the array of LED light sources being scattered by at least one object in the space;
an array of sensors proximate to the array of LED light sources and configured to receive the scattered light from the at least one object in the space, each sensor configured to determine a distance between the corresponding light source and the at least one object based on detection of the predetermined modulation pattern in the received scattered light; and
a space characterization unit configured to receive the distance from each sensor and to generate an elevation map of the space based upon the distance received from each sensor of the array of sensors and predetermined locations of the sensors in the array of sensors, the elevation map indicating a presence of the at least one object in the space by displaying a height of the at least one object as based upon the distance received from the sensor that senses the at least one object and concurrently displaying a location of the object as based upon the predetermined location of the sensor that senses the at least one object;
wherein each light source includes a plurality of light sources configured to emit the light in different wavelengths, at least one of the sensors configured to determine the distance for each of the different wavelengths, the elevation map including a color map associated with the different wavelengths.

2. The illumination system of claim 1, wherein each light source includes at least one of a spot light, a flood light or a panel light.

3. The illumination system of claim 1, wherein each light source includes a monochromatic light source.

4. The illumination system of claim 1, wherein the space characterization unit is configured to detect, based on the elevation map, at least one property of the at least one object, to control illumination by the illumination system.

5. The illumination system of claim 1, wherein the space characterization unit is configured to determine, based on the elevation map, at least one of the location of the at least one object, a pose of the at least one object or movement of the at least one object.

6. The illumination system of claim 1, wherein the space characterization unit is configured to determine, based on the elevation map, whether the at least one object is an animate object or an inanimate object.

7. The illumination system of claim 1, wherein each sensor is configured to determine a time-of-flight for the emitted light to be received by the sensor based on the detected predetermined modulation pattern, the distance being determined from the time-of-flight.

8. The illumination system of claim 1, wherein each light source is configured to be independently modulated with the predetermined modulation pattern.

9. The illumination system of claim 1, wherein two or more of the light sources are configured to be synchronously modulated with the predetermined modulation pattern.

10. A method of characterizing a space for illumination, the method comprising:
emitting light by an array of light emitting diode (LED) light sources disposed in the space for illumination, the emitted light encoded with at least one predetermined modulation pattern, the emitted light being scattered by at least one object in the space;
receiving the scattered light from at the at least one object in the space by an array of sensors proximate the array of LED light sources;
determining, by each sensor, a distance between the corresponding light source and the at least one object based on detection of the at least one predetermined modulation pattern in the received scattered light; and
generating an elevation map of the space based on the distance determined by each sensor in the array of sensors and predetermined locations of the sensors in the array of sensors, the elevation map indicating a presence of the at least one object in the space by displaying a height of the at least one object as based upon the distance received from the sensor that senses the at least one object and concurrently displaying a location of the object as based upon the predetermined location of the sensor that senses the at least one object, the space for illumination being characterized based on the elevation map; and
wherein each light source includes a plurality of light sources configured to emit the light in different wavelengths, at least one of the sensors configured to determine the distance for each of the different wavelengths, the elevation map including a color map associated with the different wavelengths.

11. The method of claim 10, the method further comprising detecting, based on the elevation map, at least one property of the at least one object, to control illumination by the array of LED light sources.

12. The method of claim 10, the method further comprising determining, based on the elevation map, at least one of the location of the at least one object, a pose of the at least one object or movement of the at least one object.

13. The method of claim 10, the method further comprising determining, based on the elevation map, whether the at least one object is an animate object or an inanimate object.

14. The method of claim 10, wherein the determining of the distance includes determining a time-of-flight for the emitted light to be received by the respective sensor based on the detected at least one predetermined modulation pattern, the distance being determined from the time-of-flight.

* * * * *